(12) United States Patent
Kim et al.

(10) Patent No.: US 7,683,594 B2
(45) Date of Patent: Mar. 23, 2010

(54) INTELLIGENT DEAD TIME CONTROL

(75) Inventors: Seungbeom Kevin Kim, Cerritos, CA (US); Todd Vacca, Mission Viejo, CA (US); Jason Zhang, Monterey Park, CA (US)

(73) Assignee: International Rectifier Corporation, El Segundo, CA (US)

( * ) Notice: Subject to any disclaimer, the term of this patent is extended or adjusted under 35 U.S.C. 154(b) by 462 days.

(21) Appl. No.: 11/757,181

(22) Filed: Jun. 1, 2007

(65) Prior Publication Data

US 2008/0298101 A1 Dec. 4, 2008

(51) Int. Cl.
G05F 1/40 (2006.01)

(52) U.S. Cl. .................................... 323/282

(58) Field of Classification Search .................. 323/271, 323/273, 275, 282, 283, 285, 351
See application file for complete search history.

(56) References Cited

U.S. PATENT DOCUMENTS

| | | | | |
|---|---|---|---|---|
| 5,747,972 A | * | 5/1998 | Baretich et al. | 323/223 |
| 5,986,895 A | * | 11/1999 | Stewart et al. | 363/16 |
| 6,307,356 B1 | * | 10/2001 | Dwelley | 323/282 |
| 6,614,208 B2 | * | 9/2003 | Narita | 323/283 |
| 6,861,826 B2 | * | 3/2005 | Lynch | 323/224 |
| 7,031,175 B2 | * | 4/2006 | Dequina et al. | 363/127 |
| 7,436,160 B2 | * | 10/2008 | Rusu et al. | 323/284 |
| 7,446,513 B2 | * | 11/2008 | Dikken et al. | 323/271 |
| 2009/0033299 A1 | * | 2/2009 | Ishino | 323/282 |
| 2009/0224732 A1 | * | 9/2009 | Kudo et al. | 323/271 |

* cited by examiner

*Primary Examiner*—Adolf Berhane
(74) *Attorney, Agent, or Firm*—Farjami & Farjami LLP

(57) ABSTRACT

A circuit for reducing switching losses in a synchronous rectifier of a switching stage including a high-side control transistor and a low-side synchronous transistor coupled at a switching node, the switching stage receiving an input voltage and providing a controlled output voltage at an output node. The circuit including a first circuit portion for sensing waveshape edges of a first signal at a gate terminal of the low-side synchronous transistor and a first voltage to determine a delay between the waveshape edge of the first signal and the waveshape edge of the first voltage; and a second circuit portion for calibrating the first signal and the first voltage to align the waveshape edge of the first signal and the waveshape edge of the first voltage, with an optional offset to achieve minimal power loss.

19 Claims, 5 Drawing Sheets

INTELLIGENT DEAD TIME CONTROL

BACKGROUND OF THE INVENTION

1. Field of the Invention

This invention relates to converter circuits and more specifically to a control circuit for reducing the dead time between conduction of high side and low side FETs in such circuit.

2. Description of the Related Art

In DC to DC conversion, "good converters" are measured according to the converter efficiency. Efficiency is determined in accordance with fewest power losses in the converters, such as switching losses and losses due to the Power Device's ON resistance.

Synchronous rectifiers are commonly used to reduce switching losses, despite their control complexity. In synchronous rectifiers, one of the main contributors of the power losses is the delay between the control of a high-side/control transistor and the low side/synchronous transistor.

FIG. 1 illustrates a well-known high-speed synchronous buck converter circuit 10. The circuit 10 includes a switching stage having a high side or control Power Device $Q_1$ and a low side or synchronous Power Device $Q_2$ coupled at a switching node. The switching stage receives an input D-C voltage $V_{IN}$ and provides a highly controlled output D-C voltage $V_0$ at an output node. The circuit 10 has an input capacitor $C_1$ parallel connected with the switching stage, an output inductor L connected between the switching node and the output node, and an output capacitor $C_2$ connected to the output node having the output D-C voltage $V_0$. A load is parallel connected with the output capacitor $C_2$.

The Power Devices $Q_1$ and $Q_2$ are turned ON and OFF as usual with pulse width modulation (PWM), so the control Power Device $Q_1$ is ON for a given time while Power Device $Q_2$ is OFF and, Power Device $Q_2$ turns ON when Power Device $Q_1$ turns OFF. The pulse width modulation is controlled to maintain a predetermined output voltage $V_0$ at the output node even though $V_{IN}$, which may be supplied by a battery in a portable electronics device, varies with age, temperature, power demand, etc.

Care must be taken to prevent simultaneous turn ON of the Power Devices $Q_1$ and $Q_2$, which would create a short circuit across the input circuit. Thus, as illustrated in FIG. 2, a certain dead time is always provided during which both Power Devices $Q_1$ and $Q_2$ are OFF. It is desirable to reduce this dead time as much as possible, preferably to zero to increase the circuit efficiency.

Previous attempts to control the dead time include a fixed delay method illustrated in FIG. 3. Here, the optimum delay, when Power Devices $Q_1$ and $Q_2$ are OFF, can be changed depending on the load, line, and Power Device. The dead time itself cannot be adjusted to achieve the optimum delay per given conditions.

An adaptive control method, illustrated in FIG. 4, is a better control scheme than the fixed delay scheme but it does not adjust itself to the changes on load, line & temperature.

A predictive control scheme illustrated in FIG. 5, monitors a voltage $V_{SW}$ at a switching node connecting the Power Devices $Q_1$ and $Q_2$ and continuously adjusts the delay until it achieves the predetermined value. In this approach, voltage $V_{SW}$ must go below the ground voltage and is compared to a fixed voltage. The voltage $V_{SW}$ going negative just enough to create an optimum delay for a minimum power loss. Due to $V_{SW}$ comparator delay, this approach does not achieve optimum dead time.

SUMMARY OF THE INVENTION

It is an object of the present invention to provide an improved solution to providing a fixed delay for any type of rectifier/Power Device by comparing low side gate drive and switch node/high side gate drive edges to achieve optimum dead time to reduce power losses.

It is a further object of the present invention to reduce or eliminate any conduction, reverse recovery, and/or shoot through loss.

A circuit is provided for reducing switching losses in a synchronous rectifier or a switching stage including a high-side control transistor and a low-side synchronous transistor coupled at a switching node, the switching stage receiving an input voltage and providing a controlled output voltage at an output node. The circuit includes a first circuit portion for sensing waveshape edges of a first signal at a gate terminal of the low-side synchronous transistor and a first voltage to determine a delay between the waveshape edge of the first signal and the waveshape edge of the first voltage; and a second circuit portion for calibrating the first signal and the first voltage to align the waveshape edge of the first signal and the waveshape edge of the first voltage.

To further optimize, the circuit can be trimmed to have a fixed delay effect. This dead time control circuit can be applied to all types of power switching devices used in half bridge or synchronous buck configurations.

Other features and advantages of the present invention will become apparent from the following description of the invention that refers to the accompanying drawings.

DETAILED DESCRIPTION OF EMBODIMENTS OF THE INVENTION

Figure 1:
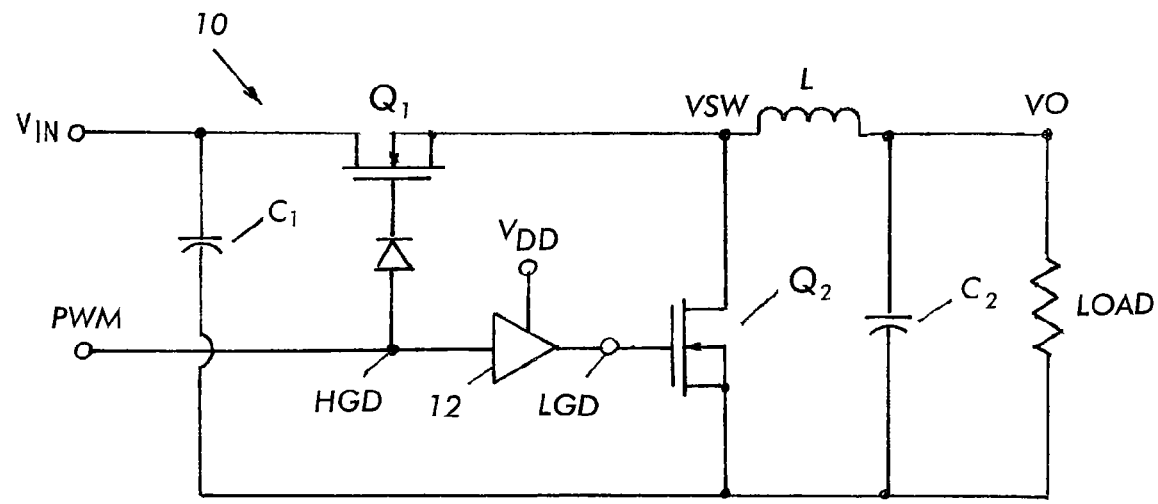
FIG. 1 is a diagram of a high-speed synchronous buck converter circuit having a switching stage

FIG. 1 shows a PWM input to gates of high- and low-side transistors $Q_1$ and $Q_2$. The signal to the high-side transistor $Q_1$ is identified as HGD and the signal to the low-side transistor $Q_2$ is inverted by an inverter 12 and identified as LGD, having a waveshape LGD shown in FIG. 2. The high- and low-side transistors $Q_1$ and $Q_2$ are connecting at a switching node.

Figure 2:
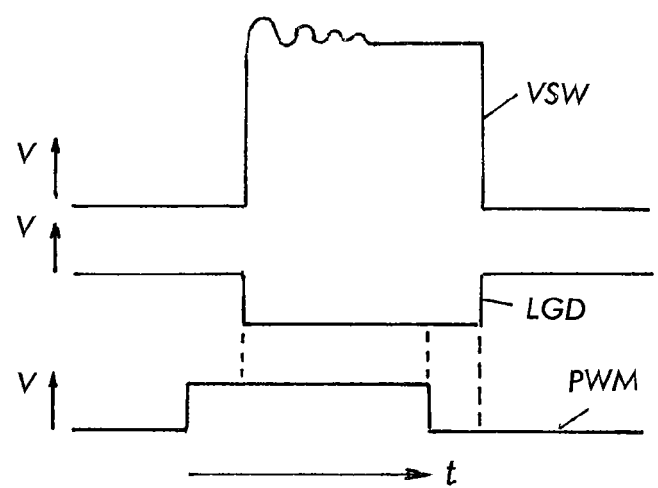
FIG. 2 is a graph showing PWM and LGD signals that turn the transistors of the switching stage of FIG. 1 ON and OFF.
Figure 3:
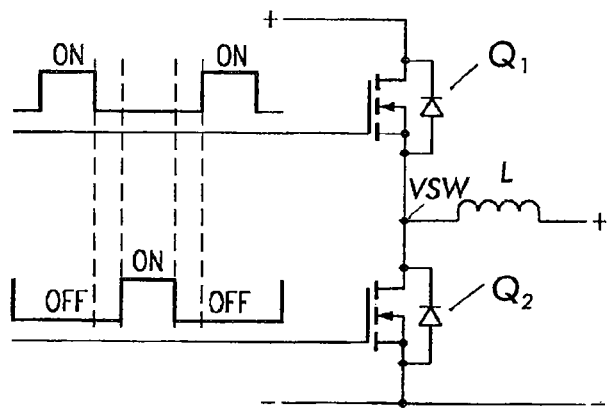
FIG. 3 is a diagram of a circuit having a switching stage and a known fixed delay scheme to control the dead time.
Figure 4:
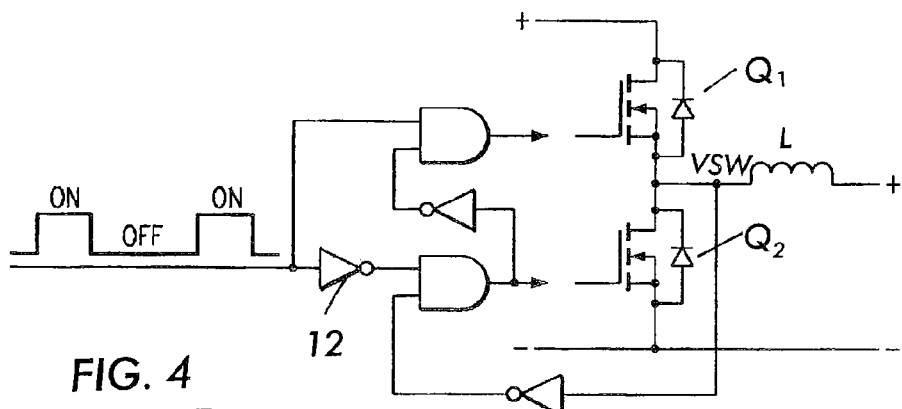
FIG. 4 is a diagram of a circuit having a switching stage and a gate driving circuit using a known adaptive control method to control the dead time.
Figure 5:
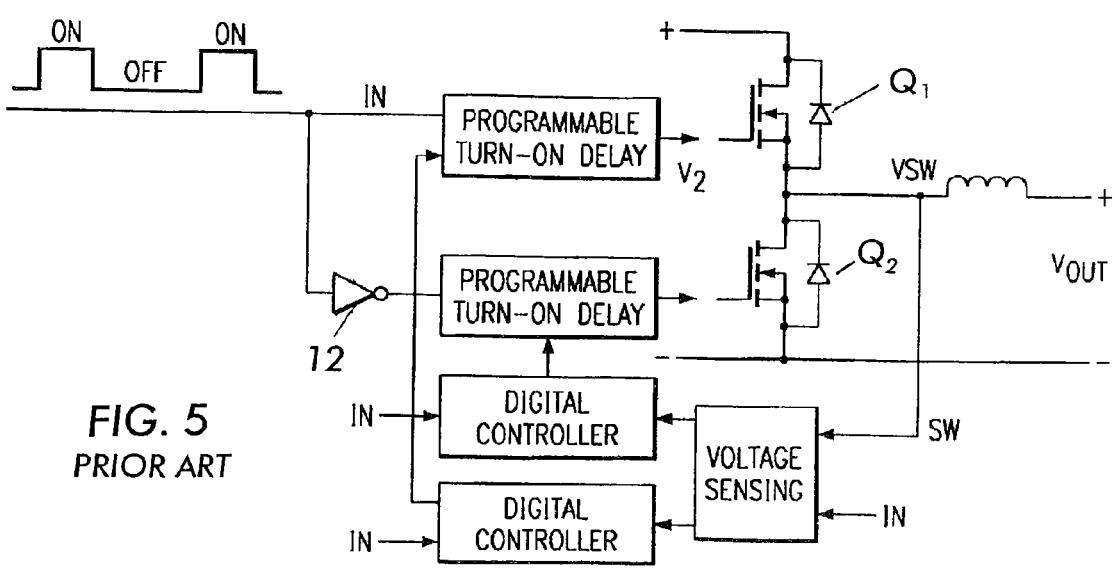
FIG. 5 is a diagram of a circuit having a switching stage and a sensing and gate driving circuit using a known predictive control method to control the dead time.

FIG. 2 illustrates, rising and falling edges of the waveshape of the signal LGD aligned with rising and falling edges of a waveshape of a voltage $V_{SW}$ at the switching node and/or a waveshape of the signal HGD.

Returning to FIG. 1, in accordance with the invention, in a high speed synchronous buck converter where the low-side transistor $Q_2$ is made to switch very fast, for example, within one nanosecond, the optimum dead time occurs when a gate signal of the low-side transistor $Q_2$ is aligned with the rise/fall edges of a waveform of the voltage $V_{SW}$ and/or the signal HGD.

The synchronization of the waveshape edges of the voltage $V_{SW}$ and/or the signal HGD and the waveshape of the signal LGD can be achieved through an analog or digital phase lock loop (PLL) to eliminate phase errors. Thus, as shown in FIG. 6, a PLL circuit 15, which is connected to the circuit of FIG. 1, each edge of the voltage $V_{SW}$ and/or the signal HGD requires one set of phase detection circuits.

Figure 6:
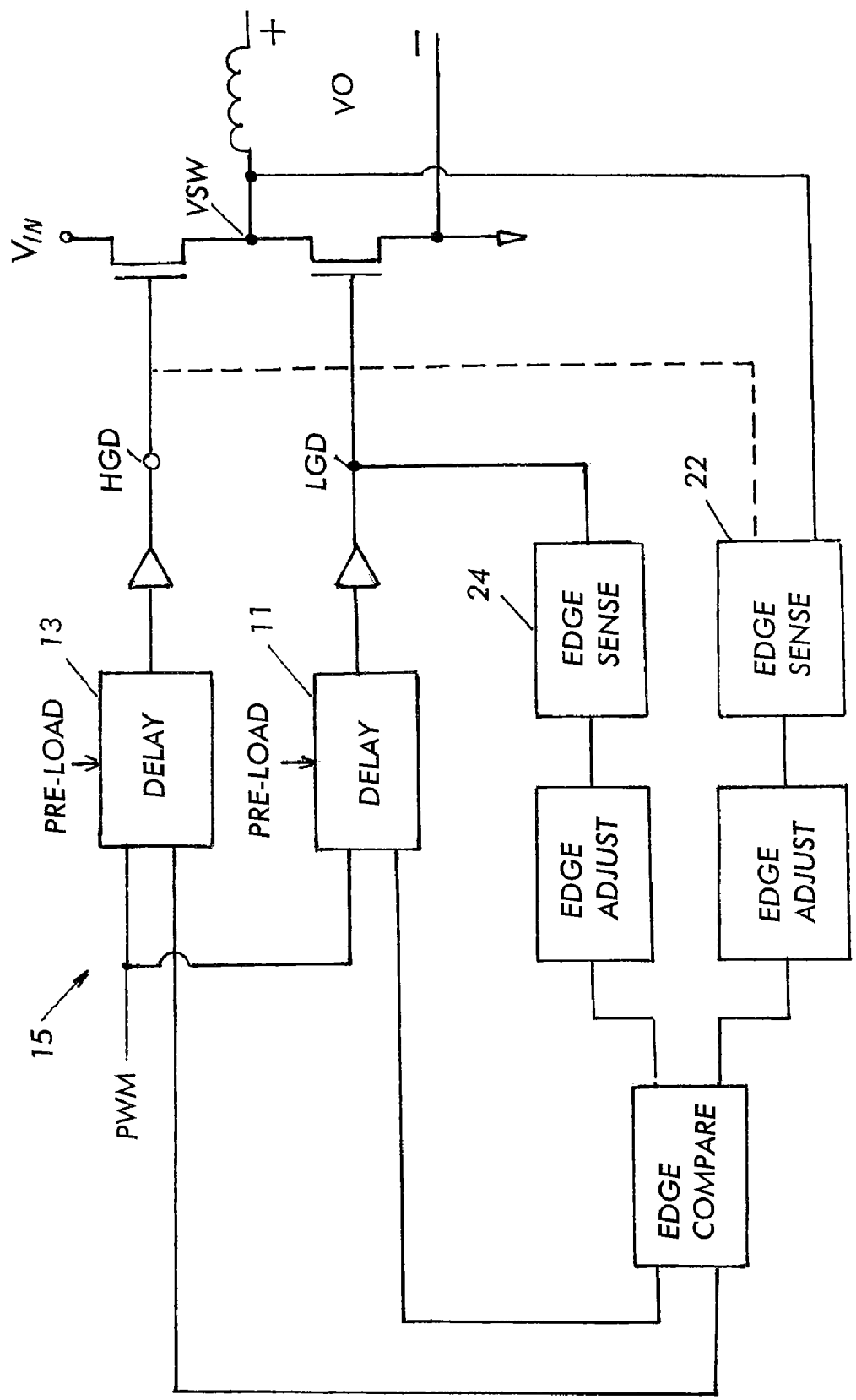
FIG. 6 is a simplified diagram of a circuit that senses and calibrates the delays of the edges of the voltage $V_{SW}$ and/or voltage at a gate of a high-side transistor and LGD signal of the circuit of FIG. 1.
Figure 7:
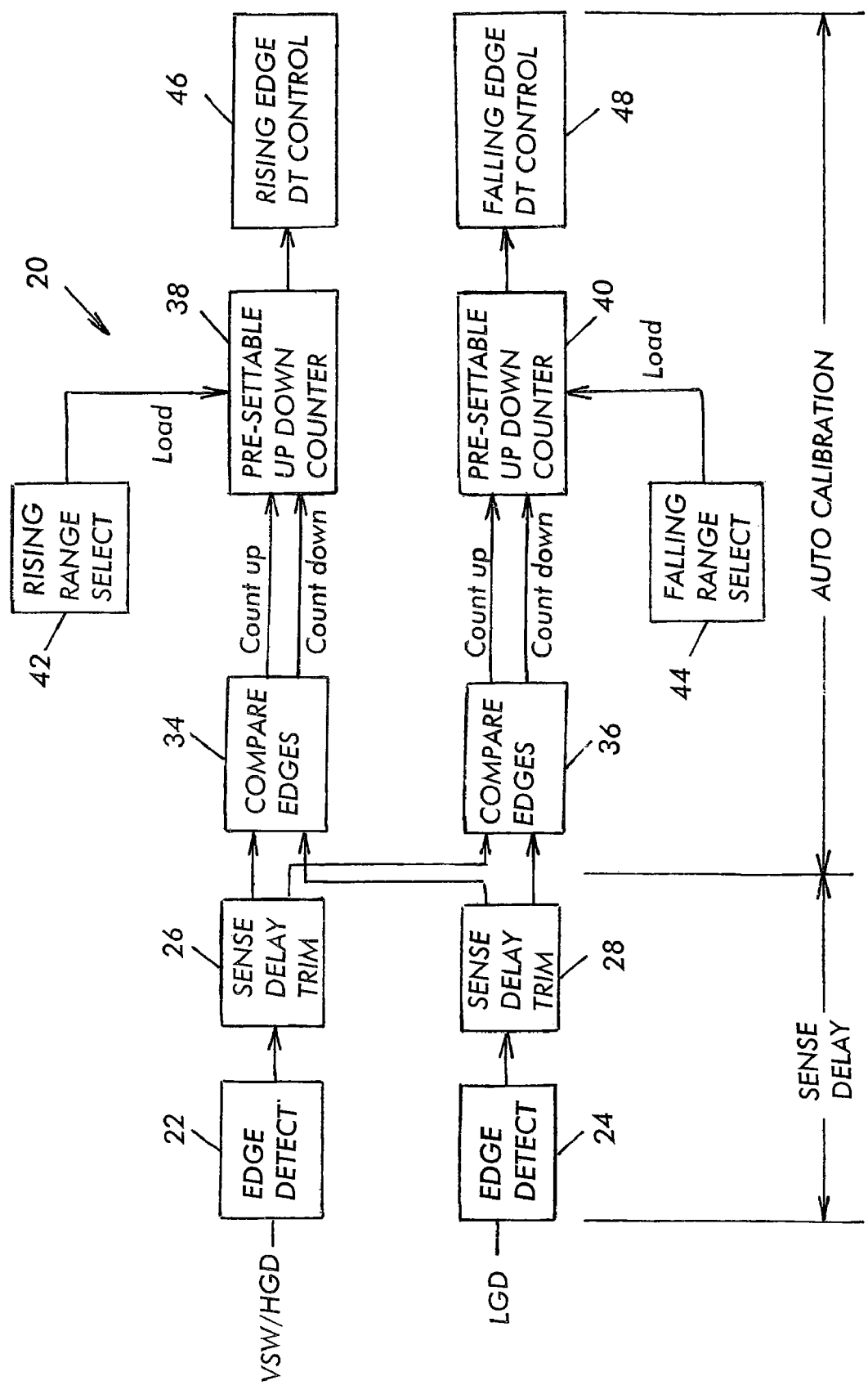
FIG. 7 is a diagram of a circuit that senses and calibrates the delays of the edges of the voltage $V_{SW}$ and/or voltage at the gate of the high-side transistor and LGD signal of the circuit of FIG. 1.

Using a rising edge of voltage $V_{SW}$ and/or the signal HGD, for example, if there is a non-overlap between the waveshape of the signal LGD and waveshape of the voltage $V_{SW}$ and/or the signal HGD in FIGS. 1 and 6, waveshape of the signal LGD, the voltage $V_{SW}$ and/or the signal HGD will be adjusted by the delay circuits 11 and 13 to introduce an overlap; where there is an overlap, the waveshape of the signal LGD, the voltage $V_{SW}$ and/or the signal HGD will be adjusted to introduce a non-overlap The conduction or reverse recovery losses on the synchronous rectifier are disposed of by monitoring the two control signals, the synchronous rectifier control signal of the signal LGD and the voltage $V_{SW}$ and/or the signal HGD. As illustrated in FIG. 7, both signal edges are first sensed in a sense delay portion of the circuit 20 and then calibrated in a calibration portion. First, in the sense delay portion, the voltage $V_{SW}$ and/or the signal HGD and the signal LGD are sensed by edge detect circuits 22 and 24 and processed through optional sense delay circuits 26 and 28, respectfully, for finer adjustment on a delay control loop.

In the calibration portion, edge compare circuits 34 and 36 compare the signals from the edge delay circuits 26 and 28 to each other and then instruct the pre-settable up/down counter circuits 38 and 40 to advance/pull back the counter. The pre-settable up/down counter circuit 38 receiving input from a rising range select circuit 42 and the pre-settable up/down counter circuit 40 receiving input from a falling range select circuit 44.

An N-bit counter output of the pre-settable up/down counter circuits 38 and 40, which can be pre-loaded to minimize the edge adjustment operation, is forwarded to rising and falling edge DT control circuits 46 and 48. A value of this N bit counter is decoded to select a corresponding delay. Operation of the circuit 20 continues until edges of both the waveshape of the voltage $V_{SW}$ and/or the signal HGD and the waveshape of the signal LGD are aligned.

The circuit 20 compares the two signals and depending on the condition of the timing, a signal to reduce or increase the delay is produced. The delay is adjusted depending on the signal produced. This operation is performed on both, the rising and falling, edges of the control signal. Additionally, a separate delay may be added to this auto calibration to correct any sensing error.

The circuit 20 finds the optimum delay independent of the output condition—load, line temperature, and/or Power Device. The delay can be adjusted by an optional delay during sensing of the edge of the waveform. There is no need for the voltage $V_{SW}$ and/or the signal HGD to go below the ground level for the circuit 20 to operate properly.

Fast Control Signal Sensing for a Synchronous Converter

Figure 8:
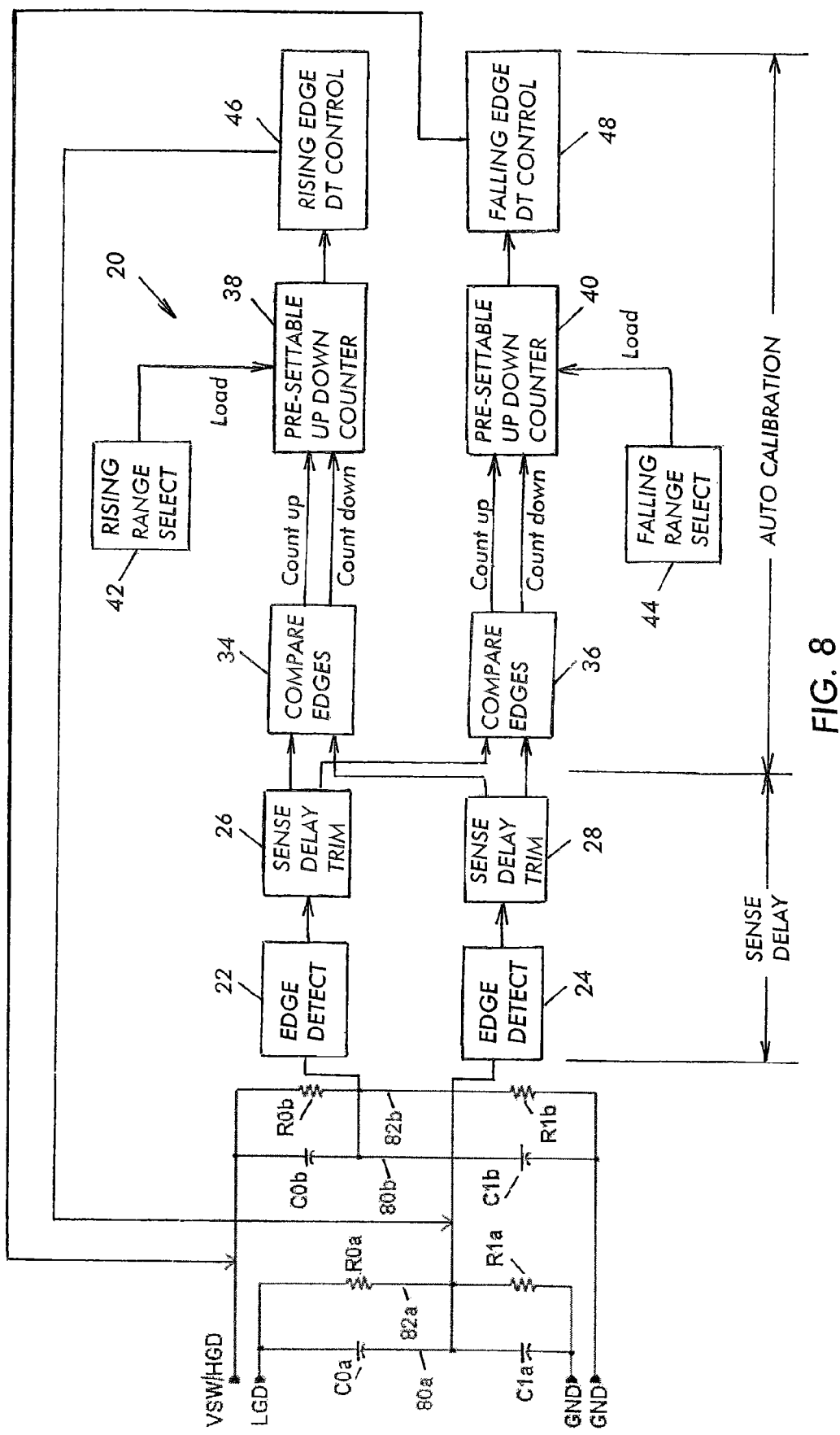
FIG. 8 is a diagram of the circuit of FIG. 7 using a capacitor divider to sense the fast moving edge with a different potential and/or high voltage signal.

A capacitor dividers 80a, 80b, illustrated in FIG. 8 as having series connected capacitors C0 and C1 or coupled between nodes LGD and the ground and SW/HGD and the ground, are used to sense the fast moving edge with a different potential. While, the capacitor divider 80 may have been used in many applications, its use with a synchronous converter is novel. A delay of the signal sensing in a control loop is very critical for many time dependent controls. In a case of the synchronous converter, the sensing of the drive signal and/or the switch node voltage is very useful information for optimizing efficiency and performance of the synchronous converter. The swing of the switch node signal to the sense node may be limited by using a resistor divider or a clamp. More power is burned and/or the sensing process is slowed down by limiting the swing.

The advantages of using the capacitor divider 80 are losses in the speed and DC power. The capacitor divider 80 needs to be charged during the transient period. But, once charged the capacitor divider 80 does not consume any power. For application that require constant DC current, parallel resistor dividers 82a, 82b, having series connected resistors R0 and R1 coupled between nodes LGD and the ground and SW/HGD and the ground, can be added to the capacitor divider to hold the DC voltage value.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for reducing switching losses in a synchronous rectifier of a switching stage including a high side control transistor and a low side synchronous transistor coupled at a switching node, the switching stage receiving an input voltage and providing a controlled output voltage at an output node, the circuit comprising:
a first circuit portion for sensing waveshape edges of a first signal at a gate terminal of the low-side synchronous transistor and a first voltage to determine a delay between the waveshape edge of the first signal and the waveshape edge of the first voltage; and
a second circuit portion for calibrating the first signal and the first voltage to align the waveshape edge of the first signal and the waveshape edge of the first voltage.

2. The circuit of claim 1, further comprising an input capacitor parallel connected with the switching stage; an output inductor connected between the switching node and the output node, an output capacitor connected to the output node having the output voltage, and a load parallel connected with the output capacitor.

3. The circuit of claim 1, wherein the circuit is self-adjustable to changes on load, line, temperature, and Power Device.

4. The circuit of claim 1, wherein the first voltage does not need to go below the ground voltage.

5. The circuit of claim 1, wherein the synchronous rectifier operates at high speed switching the low-side transistor and an optimum dead time occurring when a gate signal of the low-side transistor is aligned with the rise/fall edge of a waveform of the first voltage.

6. The circuit of claim 1, wherein the first circuit aligns waveshape edges by minimizing a delay between a first control signal of the high-side transistor and a second control signal of the low-side/synchronous transistor to thereby reduce the dead time preferably to zero.

7. The circuit of claim 1, wherein to detect the rising and falling edges of the first voltage, each edge requires a set of edge detection circuits.

8. The circuit of claim 1, wherein if there is a non-overlap between the waveshape edges of the first signal and the first voltage, the waveshape of the first signal or the first voltage will be adjusted to introduce an overlap; and if there is an overlap, the waveshape of the first signal or the first voltage will be adjusted to introduce a non-overlap.

9. The circuit of claim 1, wherein the first circuit portion comprises:
   at least two edge detect circuits for sensing the waveshape edges of the first signal and first voltage; and
   at least one sense delay circuit for processing the sensed waveshape edges.

10. The circuit of claim 9, wherein the at least one sense delay circuit is used to optimize alignment of the first signal and the first voltage.

11. The circuit of claim 9, wherein the second circuit portion comprises:
   at least one edge compare circuit for comparing the processed waveshape edges;
   at least one pre-settable counter circuit having an up/down counter for adjusting the waveshape edges; and
   rising and falling edge range select control circuits for adjusting the rising and falling waveshape edges.

12. The circuit of claim 11, wherein the up/down counter is adjusted per clock/PWM cycle.

13. The circuit of claim 11, wherein the up/down counter can be pre-loaded to minimize edge adjustment.

14. The circuit of claim 11, wherein the value of the up/down counter is decoded to select a corresponding delay or adjustment.

15. The circuit of claim 11, further comprising rising and falling edge range select circuits for pre-loading the up/down counter value to provide a setting for the waveshape edges.

16. The circuit of claim 1, wherein the first voltage is selected from a voltage at the switching node and a voltage at a gate of the high side transistor.

17. The circuit of claim 1, wherein the operation of the circuit continues until the waveshape edges of the first signal are aligned with the waveshape edges of the first voltage.

18. The circuit of claim 1, further comprising a capacitor divider for sensing fast moving waveshape edges, the capacitor divider having two series connected capacitors coupled between first and second nodes at a sense node.

19. The circuit of claim 18, further comprising a parallel resistor divider for holding a DC voltage value, the parallel resistor divider having series connected resistors coupled between the first and second nodes at a sense node.

* * * * *